July 9, 1929.   P. CARLSON   1,720,317
CAB FOR TRUCKS
Filed April 6, 1926
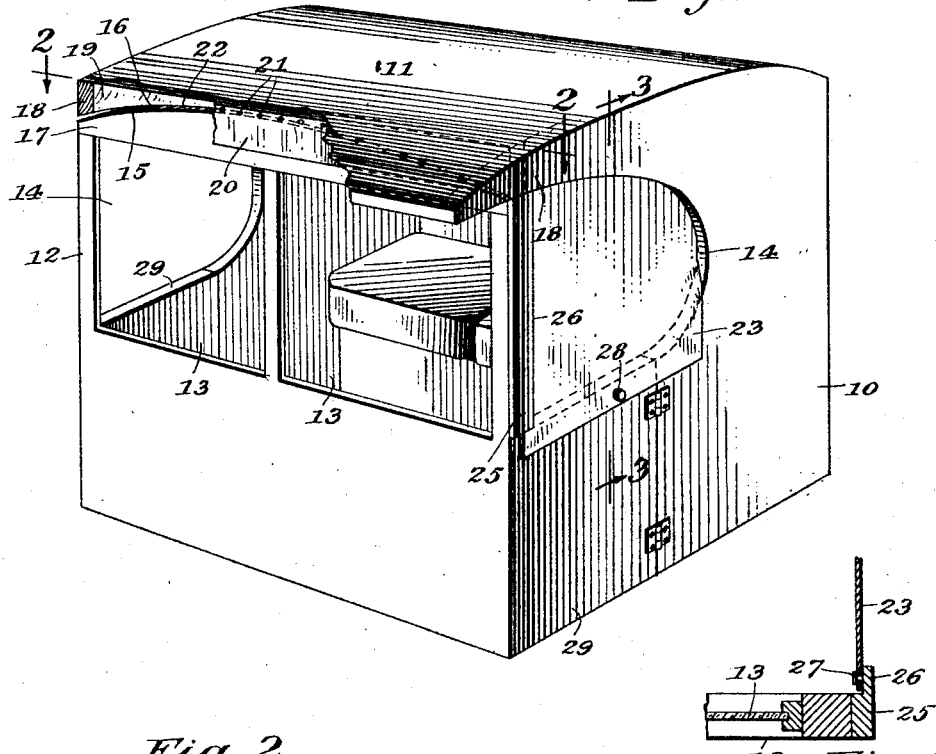
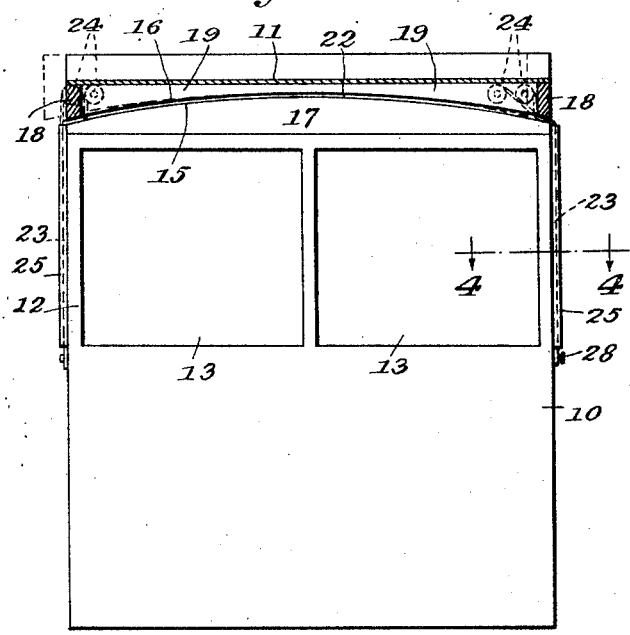
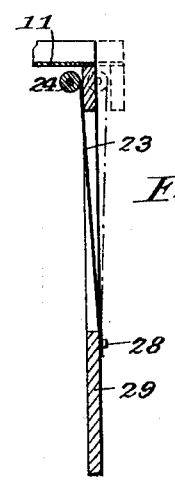
INVENTOR.
Philip Carlson
BY
G. H. Braddock
ATTORNEY Patented July 9, 1929.

1,720,317

UNITED STATES PATENT OFFICE.

PHILIP CARLSON, OF BRIDGEPORT, CONNECTICUT.

CAB FOR TRUCKS.

Application filed April 6, 1926. Serial No. 100,064.

This invention relates to a cab for a truck or the like, and an object of the invention is to provide a cab having a novel and improved assembly of cab roof and top with wind shield structure.

An ordinary truck cab of commerce includes a cab roof or top rigidly associated with a wind shield structure, both the roof or top and wind shield structure being an integral part of a cab frame rigidly supported upon the chassis frame of a vehicle, which chassis frame is subjected to considerable weaving or warping under heavy loads and over rough ground, as is well known. Naturally, the twisting movement to which the chassis frame is subjected is communicated throught the cab frame to the cab roof or top and wind shield structure to cause said roof or top and structure to have severe twisting strains relatively to each other, such strains having tendency to cause the cab roof or top, as well as the wind shield structure and the wind shield, to be broken or otherwise harmed.

A more specific object of the invention is to provide a cab having roof or top and wind shield structure which are rigidly supported upon the cab frame, but are otherwise disconnected, whereby twisting or weaving strains communicated to said cab roof or top are not transmitted to said wind shield structure, and vice versa.

A further specific object is to provide a cab having disconnected roof or top and wind shield structure as stated, and also having a device designed to effect a permanent and dependable closure between said cab roof and said wind shield structure.

A still further specific object is to provide side curtains adapted to be associated with the frame, top, and wind shield structure of the cab in a unique and improved manner.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the appended claims.

In the accompanying drawing forming a part of this specification,

Fig. 1 is a perspective view of a cab for trucks having the features of the invention, parts being broken away and in section, and one of the side curtains being shown pulled down;

Fig. 2 is a sectional view as on line 2—2 in Fig. 1, both side curtains being down;

Fig. 3 is a fragmentary sectional view as on line 3—3 in Fig. 1; and

Fig. 4 is an enlarged fragmentary sectional view as on line 4—4 in Fig. 2.

With respect to the drawing and the numerals of reference thereon, 10 denotes a cab frame having a roof or top 11 and a wind shield structure 12 with wind shields 13. The forward portion of the cab roof or top 11 extends approximately horizontally forwardly across the upper portion of the vertical wind shield structure 12, in spaced relation to said wind shield structure. 14 are the usual side openings in the frame beneath the forward portion of the cab top and at the rear of the wind shield structure.

The upper end of the wind shield structure 12 terminates on a smooth, slightly curved line or convex surface denoted 15, and the portion of the cab roof or top directly above said wind shield structure terminates on a similar curved line or concave surface 16 in close proximity to said curved line or surface 15. The surface 15, as disclosed, is the upper edge of a single cross-member 17 extending the full width of the wind shield structure, while the surface 16 is composed of the lower edges of the side walls 18 of the cab top and the lower edge of a cross-member 19 situated contiguous with the roof and between said side walls 18. 20 is a suitable closure strip secured as at 21 to the forward face of the cross-member 19 and covering the slot or opening 22 between the cab roof and wind shield structure.

The cab frame 10 is adapted to be rigidly supported upon the chassis frame of a vehicle. When the vehicle is subjected to weaving or warping, as when under heavy loads, or on rough ground, twisting movements communicated through the cab frame to the roof or top cannot be imparted to the wind shield structure, by reason of lack of a connection between said roof or top and said wind shield structure other than the connection through the instrumentality of the cab frame itself. Likewise, twisting movements communicated to said wind shield structure cannot be imparted to said roof or top. Naturally, the cab roof and top and the wind shield structure will have movements transversely of the cab frame and relatively to each other, as suggested more clearly in dotted lines in Figs. 2 and 3, each being free to move independently of the other. At the same time, the closure strip 20 effectively covers the slot or opening 22 between the cab roof and the wind shield structure. Said closure strip offers no interference to the movements of the cab roof and top and the wind shield structure relatively to each other, for the reason that the distending part of said closure strip is wholly in front of the wind shield structure. See Fig. 1.

Numeral 23 indicates curtains adapted to close the side openings 14, said curtains being upon rolls 24 each mounted at its front, in any convenient manner, upon the inner face of a side wall 18 of the cab top and at its rear upon the inner face of a side wall of the cab frame, said rolls preferably being horizontally disposed. Each of weather strips 25 of suitable material, one at each side of the cab, secured in ordinary or preferred manner to the opposite side edges of the wind shield structure, has a rearwardly extending projection 26 spaced outwardly from the cab frame and adapted to overlap a side curtain when pulled down, 27 indicating fastening means upon the inner face of said projection 26 adapted to secure the forward edge (see Fig. 4) of the curtain which passes outwardly through opening 14 and is of width to nicely fill said opening (see Fig. 1). 28 is a fastening means upon a part of the cab, for example, upon the outer face of the door 29, adapted to secure the lower edge of the curtain. Additional fastening means (not disclosed) could be utilized.

The rolls 24 are ordinary or preferred spring actuated curtain rolls, so that as the cab roof or top and the wind shield structure move transversely of the frame and relatively to each other, the curtains simply wind and unwind.

What I claim is:

1. A cab comprising a cab frame adapted to be positioned upon the chassis frame of a vehicle, the cab frame including a forwardly extending top, a wind shield structure supported upon the frame and situated beneath said top, there being an opening in a side member of said frame beneath said forwardly extending top and at the rear of said wind shield structure, the wind shield structure and cab top being free of positive connections between said structure and top other than the connection through the instrumentality of the cab frame, and a curtain adapted to close said opening in said side member, said curtain being upon a spring actuated roll mounted in said top and being adapted to pass outwardly through said opening, and means for securing said curtain to a part of said cab when the curtain is drawn down.

2. A cab comprising a cab frame adapted to be positioned upon the chassis frame of a vehicle, the cab frame including a forwardly extending top, a wind shield structure supported upon the frame and situated beneath said top, there being an opening in a side member of said frame beneath said forwardly extending top and at the rear of said wind shield structure, the wind shield structure and cab top being free of positive connections between said structure and top other than the connection through the instrumentality of the cab frame, and a curtain adapted to close said opening in said side member, said curtain being upon a spring actuated roll mounted in said top and being adapted to pass outwardly through said opening, there being a weather strip upon said wind shield structure with projection spaced outwardly from said frame, and means upon said projection and a part of said cab for securing said curtain when drawn down.

3. A cab comprising a cab frame adapted to be positioned upon the chassis frame of a vehicle, the cab frame including a forwardly extending top, a wind shield structure supported upon the frame and situated beneath said top, there being an opening in a side member of said frame beneath said forwardly extending top and at the rear of said wind shield structure, and a curtain adapted to close said opening in said side member, said curtain being upon a roll mounted in said top and being adapted to pass outwardly through said opening, there being a strip upon said wind shield structure and spaced outwardly from said frame, the strip being adapted to overlap the curtain when drawn, and means upon the inner face of the strip for securing said curtain.

Signed at Bridgeport, in the county of Fairfield and State of Connecticut, this 17 day of March, A. D. 1926.

PHILIP CARLSON.